(12) United States Patent
Kuhns

(10) Patent No.: US 7,471,218 B2
(45) Date of Patent: Dec. 30, 2008

(54) METHODS AND SYSTEMS FOR EFFICIENTLY STORING AND RETRIEVING STREAMING DATA

(75) Inventor: Mark D. Kuhns, Peoria, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/523,131

(22) Filed: Sep. 18, 2006

(65) Prior Publication Data

US 2008/0068231 A1 Mar. 20, 2008

(51) Int. Cl.
*H03M 7/00* (2006.01)
(52) U.S. Cl. .................. 341/60; 345/530; 345/545
(58) Field of Classification Search .............. 341/60; 345/530, 543
See application file for complete search history.

(56) References Cited

U.S. PATENT DOCUMENTS

| | | | | |
|---|---|---|---|---|
| 5,867,178 A | | 2/1999 | Murphy et al. | |
| 6,011,496 A | * | 1/2000 | Park et al. | 341/55 |
| 6,239,815 B1 | * | 5/2001 | Frink et al. | 345/502 |
| 2004/0228326 A1 | * | 11/2004 | Pearson | 370/352 |
| 2005/0246178 A1 | * | 11/2005 | Fejzo | 704/500 |
| 2007/0076009 A1 | * | 4/2007 | Porchet et al. | 345/543 |
| 2007/0153013 A1 | * | 7/2007 | Wells et al. | 345/549 |

FOREIGN PATENT DOCUMENTS

| | | |
|---|---|---|
| KR | 10-2000-0057467 A | 9/2000 |
| KR | 10-2001-0034213 A | 4/2001 |
| KR | 10-2001-0051292 A | 6/2001 |
| KR | 10-2001-0099967 A | 11/2001 |
| KR | 10-2001-0101937 A | 11/2001 |

* cited by examiner

*Primary Examiner*—Khai M Nguyen (57) ABSTRACT

Various technologies for efficiently storing and retrieving streaming data are described. Bits of data (e.g., P bits of data) are received and separated into most significant bits (MSB) of data and least significant bits (LSB) of data. Further, the MSB of data and the LSB of data are respectively packed into a first word and a second word. The first word is stored in a first area of a frame buffer and the second word is stored in a second area of the frame buffer. As a result, data is managed in a more efficient way to reduce memory bandwidth requirement.

20 Claims, 7 Drawing Sheets

METHODS AND SYSTEMS FOR EFFICIENTLY STORING AND RETRIEVING STREAMING DATA

TECHNICAL FIELD

Embodiments generally relate to various technologies for efficiently storing and retrieving streaming data.

BACKGROUND

Streaming data, such as video data, is often stored in memory on a frame by frame basis. In general, all frames for a particular application have equal amounts of data. However, if the application accesses multiple delayed frames, such as delayed frame F1 and delayed frame F2, it may require different amounts of data from F1 than from F2.

In one example, the input data of a video system has P dimensions. An application of the video system may require P bits of data from a delayed frame F1 but only M bits of data (it is understood here that M is less than P) from a delayed frame F2.

During a conventional storage phase, with regards to frame F1, it is stored using P bits of data. With regards to frame F2, it is also accessed using P bits of data although only M bits of data are needed by the application to represent frame F2. Similarly, during a conventional retrieval phase, with frame F1, all P bits are accessed. With regards to frame F2, all P bits are accessed as well even though only M bits of data are needed by the application to represent F2.

Clearly, the conventional approach to storing and retrieving data is ineffective as it fails to distinguish between different frames (e.g., F1 and F2). As a result, memory bandwidth utilization is not maximized. This inefficient use of memory bandwidth translates into performance degradation in video systems, such as motion vector processing systems and/or LCD display response-time compensation systems.

SUMMARY

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various technologies for efficiently storing and retrieving streaming data are described. In one embodiment, bits (e.g., P bits) of data are received and separated into most significant bits (MSB) of data and least significant bits (LSB) of data. Further, the MSB of data and the LSB of data are respectively packed into a first word (e.g., an N bit word) and a second word. The first word is stored in a first area of a frame buffer and the second word is stored in a second area of the frame buffer.

Additionally, in one embodiment, if both the MSB of data and the LSB of data are needed, then the MSB of data and the LSB of data are accessed, unpacked, and recombined to form a word (e.g., a P bit word). If only the MSB of data is needed, then the MSB of data is accessed and unpacked to form a word (e.g., an M bit word).

As a result, embodiments store and retrieve data in a more efficient way. In this manner, embodiments effectively reduce memory bandwidth requirement.

DETAILED DESCRIPTION OF THE DRAWINGS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Streaming data, such as video and/or audio data, is often stored and retrieved in an inefficient way. Typically, with video data, an incoming P bit video data is stored on a frame basis. Because an application program may not require the same resolution for all the frames, the application program may require all P bits of data from one frame and only require M bits of data (M is less than P) from another frame.

However, under conventional approaches, all P bits of data of a frame are retrieved even if only M bits of data are utilized by an application program. This is detrimental to the efficiency of a memory storage system as data that is unused is stored and retrieved along with data that is useful, thus taking up valuable bandwidth that could otherwise be dedicated to other usage, or that could otherwise allow the bandwidth to be reduced.

Contrary to traditional approaches, embodiments intelligently distinguish between data that is used and data that is not used. Embodiments, among other things, tailor its approach to storing and retrieving data to optimally serve an associated application program. In one embodiment, incoming data is separated into most significant bits (MSB) and least significant bits (LSB). The MSB may represent the more important portions of the incoming data while the LSB may represent the less important portions of the incoming data. The MSB and the LSB are separately packed and stored in separate logical buffers. If both the MSB and LSB are needed by an application program, then the MSB and LSB are recombined and forwarded to the application program. Alternatively, if only the MSB are needed, then the LSB is omitted and only the MSB is forwarded to the application program. As a result, in the case that the LSB is not needed, the resulting frame buffer throughput requirement is reduced.

Figure 1:
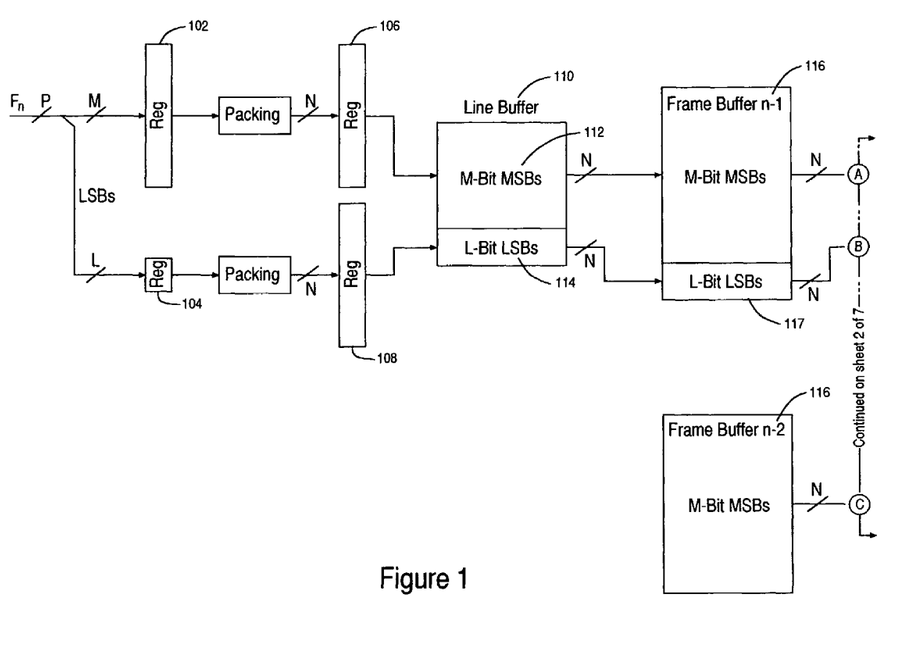
FIG. 1 illustrates block diagrams of an embodiment of the present claimed subject matter in operation.

FIG. 1 illustrates block diagrams of an embodiment of the present claimed subject matter in operation. In FIG. 1, an incoming data stream of P bits are split into M bits of Most Significant Bits (MSB) data and L bits of Least Significant Bits (LSB) data (It is noted that P>M>L throughout the remainder of the detailed description).

Also, although FIG. 1 is shown and described as having certain numbers and types of elements, embodiments are not so limited; that is other embodiments may include elements other than those shown, and may include more than one of the elements that are shown. Further, although FIG. 1 is illustrated under the present arrangement of elements, embodiments are not limited to the present arrangement of elements illustrated in FIG. 1.

The M bit MSBs are processed by register 102 and the L bit LSBs are processed by register 104 respectively. The M bits of data and L bits of data are packed into N bit words. The N bit words go through register 106 and 108 and are buffered in the line buffer 110. The M bit MSBs are separately buffered in a first portion 112 of the line buffer 110 and the L bit LSBs are buffered in a second portion 114 of the line buffer 110.

Also, the M bit MSBs and the L bit LSBs are separately stored in the first portion of the frame-store 116 and the second portion of the frame-store 117. In this way, the M bit MSBs and the L bit LSBs are stored in separate logical buffers and can be accessed independently.

When accessing the F(n-1) data, the M bit MSBs and the L bit LSBs are accessed independently from their respective frame store buffers 116 and 117, buffered up in the line buffer 110 to align the data, unpacked, and recombined to form the original P bit data.

When accessing the F(n-2) data, only the M bit MSBs is accessed, buffered, unpacked to form a M bit data. Because the L bit LSB is not required and not accessed, the memory bandwidth requirement is reduced.

Figure 2:
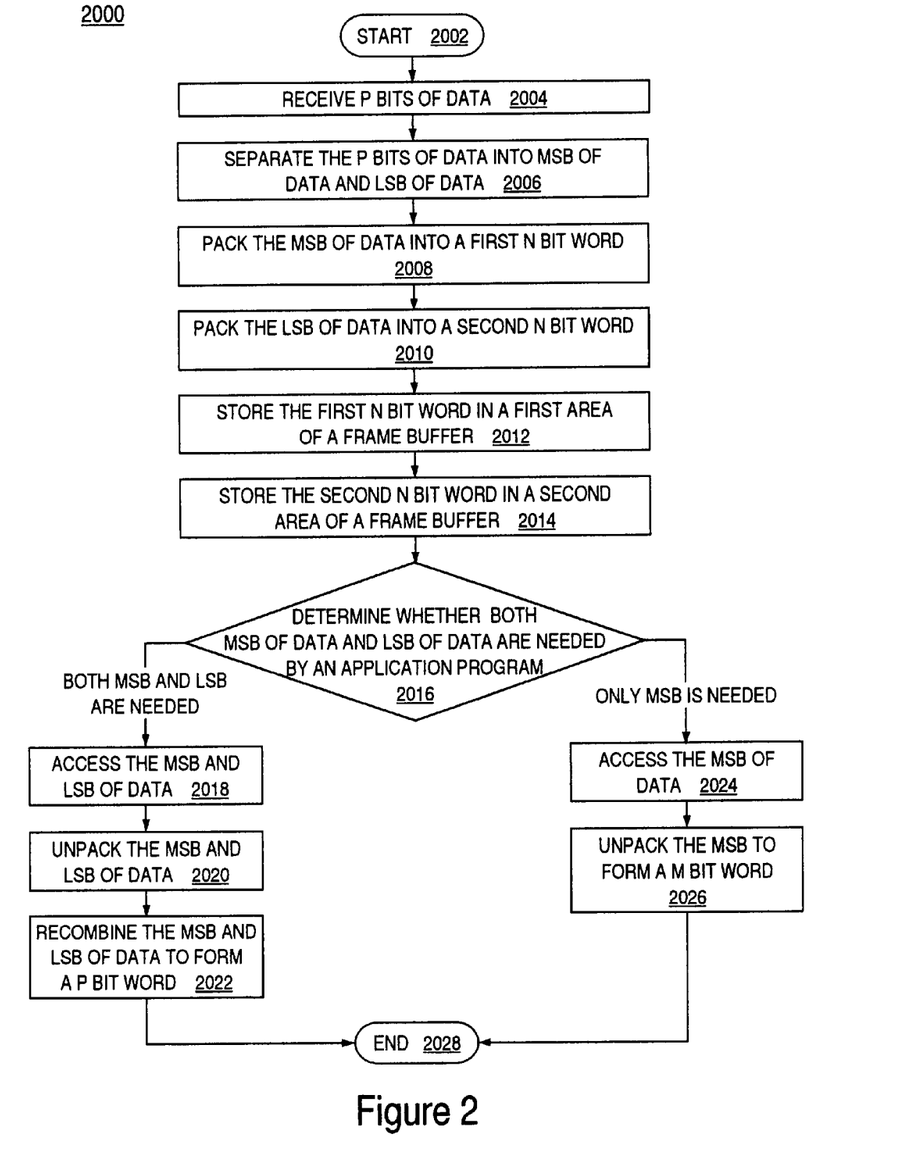
FIG. 2 illustrates a flowchart of a method for storing and retrieving data upon which embodiments in accordance with the present claimed subject matter can be implemented.

FIG. 2 illustrates a flowchart 2000 for storing and retrieving data upon which embodiments in accordance with the present claimed subject matter can be implemented. Although specific steps are disclosed in flowchart 2000, such steps are exemplary. That is, embodiments of the present claimed subject matter are well suited to performing various other additional steps or variations of the steps recited in flowchart 2000. It is appreciated that the steps in flowchart 2000 can be performed in an order different than presented. At block 2002, the process starts.

At block 2004, P bits of data are received. The data can be various types of streaming data, such as but not limited to video data and/or audio data. At block 2006, the P bits of data are separated into Most Significant Bits (MSB) of data and Least Significant Bits (LSB) of data.

At block 2008, the MSB of data is packed into a first N bit word (e.g., a 32 bit SDRAM word). At block 2010, the LSB of data is packed into a second N bit word (e.g., a 32 bit SDRAM word). At block 2012, the first N bit word is stored in a first area of a frame buffer. At block 2014, the second N bit word is stored in a second area of a frame buffer.

At block 2016, it is determined whether both the MSB of data and the LSB of data are needed by an application program. If both the MSB and the LSB are needed, the process proceeds to block 2018. If only the MSB is need, the process proceeds to block 2024. By storing the MSB of data and the LSB of data separately, embodiments are able to tailor its data retrieval method to match the needs of an application program. Because the MSB of data and LSB of data are stored separately, they can also be retrieved separately. As a result, if only the MSB of data is required, it can be independently retrieved and provided to an application program. By bypassing the need to access the LSB of data, memory bandwidth utilization is reduced.

At block 2018, the MSB and LSB of data are accessed. At block 2020, the MSB and LSB of data are unpacked. At block 2022, the MSB and LSB of data are recombined to form a P bit word. In one example, the P bit word is forwarded to an application program. At block 2024, the MSB of data is accessed. At block 2026, the MSB is unpacked to form an M bit word. At block 2028, the process ends.

As such, flowchart 2000 illustrates ways upon which embodiment can store and retrieve data in a more efficient way. Consequently, embodiments effectively reduce memory bandwidth requirement. Furthermore, it is important to note that this method is achieved without degrading the performance of the application program. Also, all of the data accesses to the frame stores are used. With certain application programs, this reduction is sufficient to reduce the type/expense/number of memories required to implement the frame store.

Figure 3:
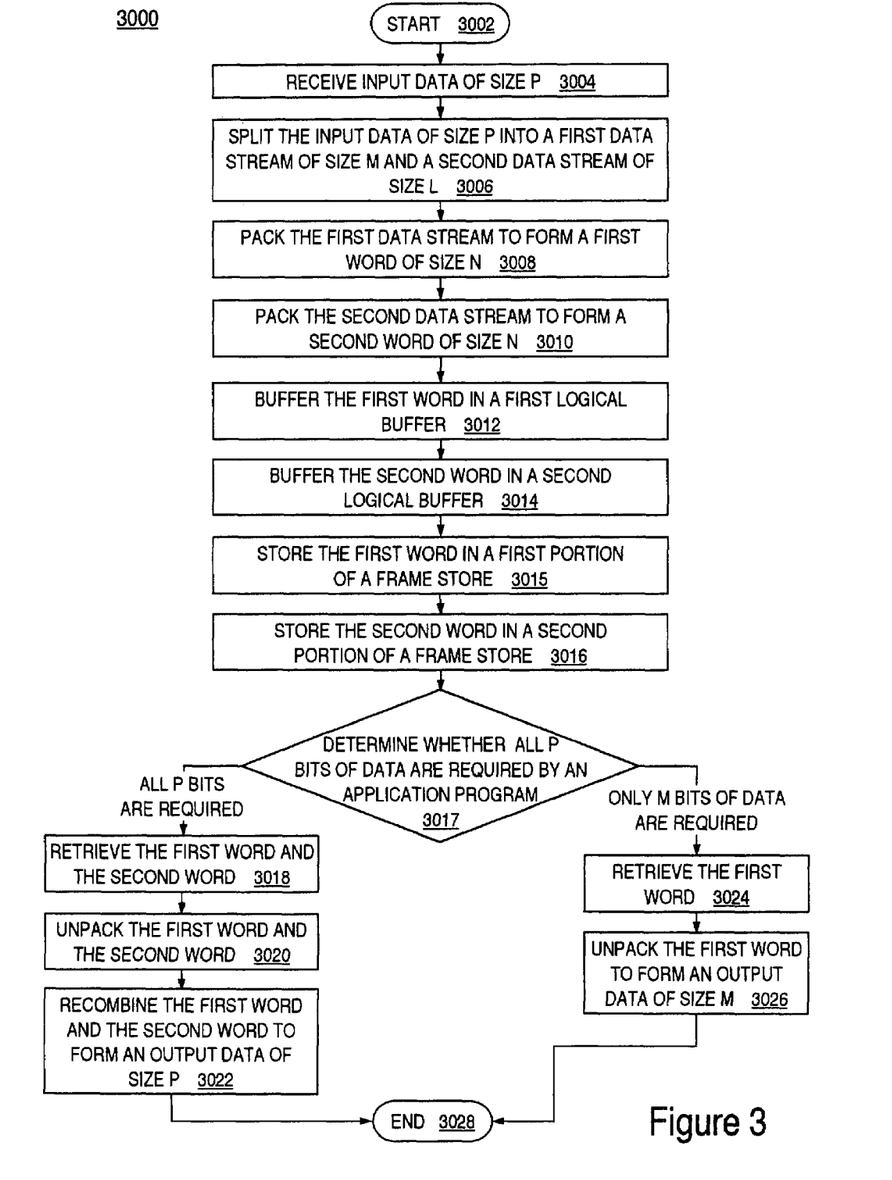
FIG. 3 illustrates a flowchart of a method for splitting an input data upon which embodiments in accordance with the present claimed subject matter can be implemented.

FIG. 3 illustrates a flowchart 3000 for splitting an input data upon which embodiments in accordance with the present claimed subject matter can be implemented. Although specific steps are disclosed in flowchart 3000, such steps are exemplary. That is, embodiments of the present claimed subject matter are well suited to performing various other or additional steps or variations of the steps recited in flowchart 3000. It is appreciated that the steps in flowchart 3000 can be performed in an order different than presented. At block 3002, the process starts.

At block 3004, the input data of size P is received. At block 3006, the input data of size P is split into a first data stream of size M and a second data stream of size L. At block 3008, the first data stream is packed to form a first word of size N. At block 3010, the second data stream is packed to form a second word of size N.

At block 3012, the first word is buffered in a first logical buffer. At block 3014, the second word is buffered in a second logical buffer. At block 3015, the first word is stored in a first portion of a frame store. At block 3016, the second word is stored in a second portion of a frame store.

At block 3017, it is determined whether all P bits of the data are required by an application program. If all P bits are required, the process proceeds to block 3018. If only M bits are required, the process proceeds to block 3024.

At block 3018, the first word and the second word are retrieved. It is important to note that the first word and second word are retrieved independently of one another. Contrary to prior approaches, the retrieval of the first word does not necessitate the retrieval of the second word. At block 3020, the first word and the second word are unpacked. At block 3022, the first word and the second word are recombined to form an output data of size P.

At block 3024, the first word is retrieved. At block 3026, the first word is unpacked to form an output size of size M. At block 3028, the process ends.

Figure 4:
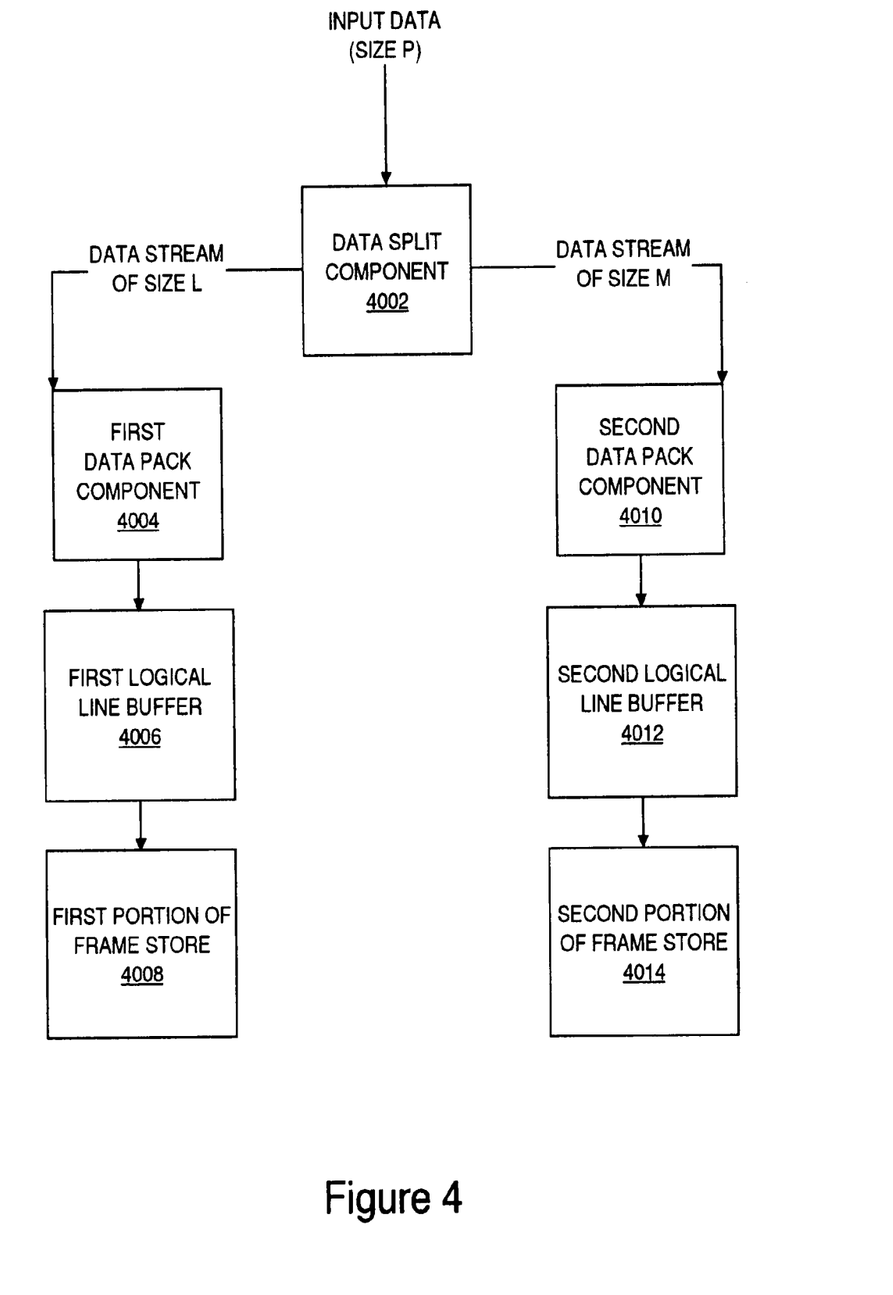
FIG. 4 illustrates block diagrams of an embodiment of the present claimed subject matter in operation during the storage phase.
Figure 5:
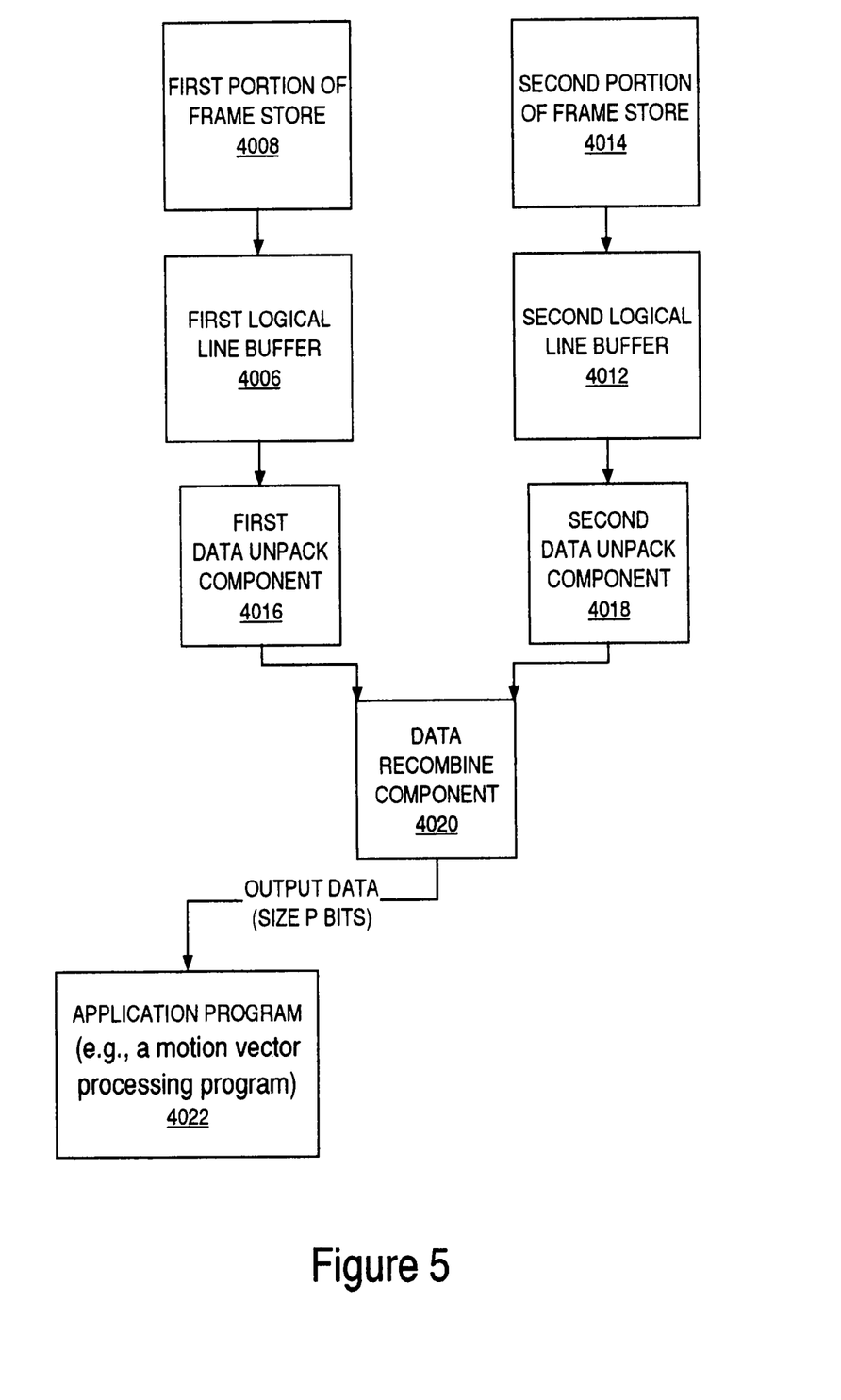
FIG. 5 illustrates block diagrams of an embodiment of the present claimed subject matter in operation during the retrieval phase when an output data of size P is needed by an application.
Figure 6:
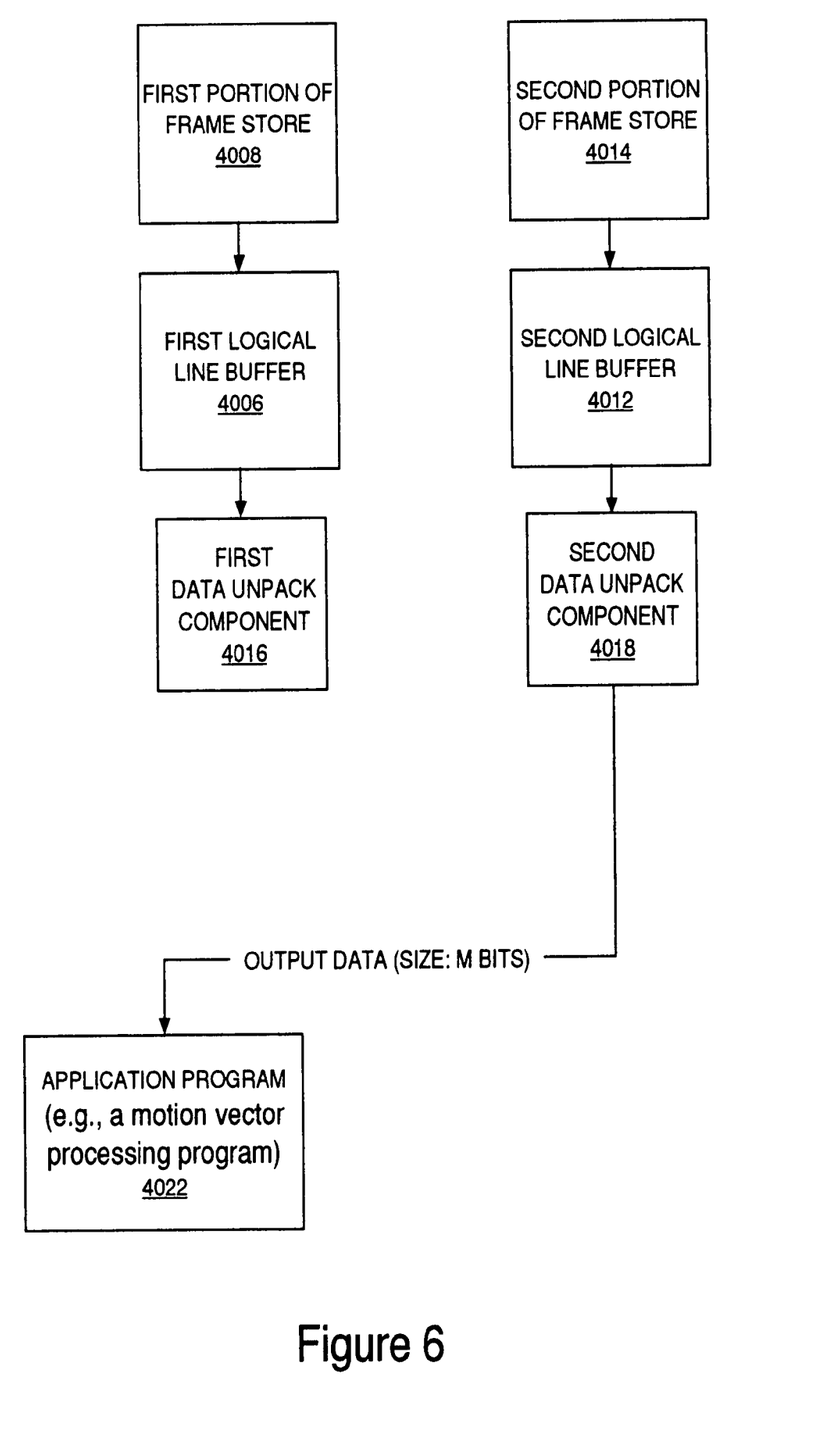
FIG. 6 illustrates block diagrams of an embodiment of the present claimed subject matter in operation during the retrieval phase when an output data of size M is needed by an application program.

FIG. 4, FIG. 5, and FIG. 6 jointly illustrate a system for storing and retrieving data in operation, in accordance with an embodiment of the present claimed subject matter. FIG. 4 provides an illustration of the process during the storage phase. FIG. 5 provides an illustration of the process when an output data of size P is needed by an application program during the retrieval phase. FIG. 6 provides an illustration of the process when an output data of size M is needed by an application program during the retrieval phase.

With reference to FIG. 4, an input data (e.g., video stream and/or audio stream) of size P is received by a data split component 4002. The data split component 4002 splits the input data into a data stream of size L and a data stream of size M. The data stream of size L is processed by the first data pack component 4004 and packed into a first N bit word. Similarly, the data stream of size M is processed by the second data pack component and packed into a second N bit word. The first N bit word is buffered in the first logical line buffer 4006 and the second N bit word is buffered in the second logical line buffer 4012. Subsequently, the first N bit word is stored in the first portion of frame store 4008 and the second N bit word is stored in the second portion of frame store 4014.

With reference now to FIG. 5, if an output data of size P is required by an application program, such as application program 4022, then both the first N bit word and the second N bit word are retrieved from the first portion of the frame stored 4008 and second portion of the frame store 4014 respectively. Also, the first N bit word and the second N bit word are buffered in the first logical line buffer 4006 and second logical line buffer 4012 to align the data. Further, the first N bit word and the second N bit word are unpacked using the first data unpack component 4016 and the second data unpack component 4018. Moreover, the unpacked data is recombined at the data recombine component 4020 to form an output data of size P. In one example, the output data is forwarded to the application program 4022.

With reference now to FIG. 6, if only an output data of size M is required by an application program, then only the second N bit word is retrieved from the second portion of the frame store 4014. The second N bit word is buffered in the second logical line buffer 4012 to align the data. Further, the second N bit word is unpacked using the second data unpacked component 4018 to form an output data of size M. In one example, the output data is forwarded to the application program 4022.

In the foregoing specification, embodiments have been described with reference to numerous specific details that may vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving a single stream of data having a first frame and a second frame;
   separating said first frame into first most significant bits (MSB) and first least significant bits (LSB);
   separating said second frame into second MSB and second LSB;
   determining a first resolution of said first frame and a second resolution of said second frame required by an application program;
   accessing said first MSB for said first resolution; and
   accessing said second MSB and said second LSB for said second resolution, wherein said first resolution and said second resolution are different from each other.

2. The method of claim 1, wherein each one of said first frame and said second frame comprises P bits of data.

3. The method of claim 2, wherein each one of said first MSB and said second MSB comprises M bits of data.

4. The method of claim 3, wherein each one of said first LSB and said second LSB comprises said P bits subtracted by said M bits.

5. The method of claim 4, wherein said separating said first frame and said separating said second frame comprise packing each one of said first MSB, said first LSB, said second MSB, and said second LSB into a respective N bit word.

6. The method of claim 5, wherein said separating said first frame and said separating said second frame further comprise:
   storing said respective N bit word for said first MSB and said respective N bit word for said second MSB into a first area of a frame buffer; and
   storing said respective N bit word for said first LSB and said respective N bit word for said second LSB into a second area of said frame buffer.

7. The method of claim 6, wherein said accessing said first MSB further comprises:
   retrieving said first MSB; and
   unpacking said first MSB.

8. The method of claim 7, wherein said accessing said second MSB and said second LSB further comprises:
   retrieving said second MSB and said second LSB; and
   unpacking said second MSB and said second LSB.

9. The method of claim 8, further comprising aligning said second MSB and said second LSB using at least one buffer.

10. The method of claim 1, wherein said stream of data is video data or audio data.

11. A method, comprising:
receiving a single stream of data having a first frame and a second frame;
separating said first frame into first most significant bits (MSB) and first least significant bits (LSB);
separating said second frame into second MSB and second LSB;
forwarding said first MSB of said first frame to an application program; and
forwarding said second MSB and said second LSB of said second frame to said application program, wherein a resolution of said first MSB is different from a resolution of said second MSB and said second LSB in combination.

12. The method of claim 11, wherein said separating said first frame and said separating said second frame further comprise packing each one of said first MSB, said first LSB, said second MSB, and said second LSB into a respective N bit word.

13. The method of claim 12, wherein said separating said first frame and said separating said second frame further comprise:
storing said respective N bit word for said first MSB and said respective N bit word for said second MSB into a first area of a frame buffer; and
storing said respective N bit word for said first LSB and said respective N bit word for said second LSB into a second area of said frame buffer.

14. The method of claim 13, wherein said forwarding said first MSB comprises:
retrieving said first MSB; and
unpacking said first MSB.

15. The method of claim 14, wherein said forwarding said second MSB and said second LSB comprises:
retrieving said second MSB and said second LSB; and
unpacking said second MSB and said second LSB, wherein said second MSB and said second LSB are aligned using at least one buffer.

16. A system for processing a single data stream with a plurality of frames, comprising:
a data split component for splitting an input data of size P in a frame into first data of size M and second data of size L;
a first data pack component for packing said first data to form a first word of size N;
a second data pack component for packing said second data to form a second word of size N;
a first logical line buffer for buffering said first word;
a second logical line buffer for buffering said second word;
a first portion of a frame store for storing said first word;
a second portion of said frame store for storing said second word;
a data recombine component for recombining said first word and said second word to form an output data of size P, wherein said first data from said first portion of said frame store or said output data of size P is forwarded to an application program based on a resolution of said frame required by said application program; and
wherein a resolution of at least one of said plurality of frames in said single stream is different from said resolution of said frame when processed by said application program.

17. The system of claim 16, further comprising:
a first data unpack component for unpacking said first word; and
a second data unpack component for unpacking said second word.

18. The system of claim 17, wherein said first logical line buffer and said second logical line buffer are used to align said output data.

19. The system of claim 16, wherein said input data comprises a video frame.

20. The system of claim 16, wherein said input data comprises an audio frame.

* * * * *